United States Patent
Lu et al.

(10) Patent No.: US 12,526,126 B2
(45) Date of Patent: Jan. 13, 2026

(54) SAMPLING FROM BINOMIAL DISTRIBUTION IN SECURE MULTI-PARTY COMPUTATION

(71) Applicants: Lemon Inc., Grand Caymon (KY); Beijing Zitiao Network Technology Co., Ltd., Beijing (CN)

(72) Inventors: Donghang Lu, Culver City, CA (US); Yongchuan Niu, Beijing (CN); Jian Du, Culver City, CA (US); Qiang Yan, Shanghai (CN)

(73) Assignees: Lemon Inc., Grand Cayman (KY); Beijing Zitiao Network Technology Co. Ltd., Beijing (CN)

( * ) Notice: Subject to any disclaimer, the term of this patent is extended or adjusted under 35 U.S.C. 154(b) by 63 days.

(21) Appl. No.: 18/664,052

(22) Filed: May 14, 2024

(65) Prior Publication Data
US 2025/0247205 A1 Jul. 31, 2025

Related U.S. Application Data

(63) Continuation of application No. PCT/CN2024/074509, filed on Jan. 29, 2024.

(51) Int. Cl.
*H04L 9/00* (2022.01)
(52) U.S. Cl.
CPC .......... *H04L 9/008* (2013.01); *H04L 2209/46* (2013.01)
(58) Field of Classification Search
CPC ..................................................... H04L 9/008
See application file for complete search history.

(56) References Cited

U.S. PATENT DOCUMENTS

| | | | | |
|---|---|---|---|---|
| 10,833,871 | B2* | 11/2020 | Ranellucci | H04L 9/3255 |
| 10,855,458 | B2* | 12/2020 | Xu | H04L 9/16 |
| 11,341,269 | B2* | 5/2022 | Veugen | H04L 9/008 |
| 11,595,185 | B2* | 2/2023 | Veugen | H04L 9/008 |
| 11,775,390 | B2* | 10/2023 | Eldefrawy | H04L 9/14 714/15 |
| 12,192,381 | B2* | 1/2025 | Beery | H04L 9/3252 |
| 2023/0224148 | A1* | 7/2023 | Newton | H04L 9/0819 380/278 |
| 2024/0007274 | A1* | 1/2024 | Tsuchida | H04L 9/0869 |
| 2024/0370865 | A1* | 11/2024 | Bernardi | G06Q 20/36 |
| 2025/0045742 | A1* | 2/2025 | Liu | G06Q 20/36 |

\* cited by examiner

*Primary Examiner* — Viral S Lakhia
(74) *Attorney, Agent, or Firm* — Fish & Richardson P.C.

(57) ABSTRACT

Methods, systems, and apparatus, including computer programs encoded on computer storage media, for generating a random noise value for use in providing differential privacy in multiparty computation. One of the method includes receiving, by a first party participating in a multiparty secure computation ("MPC") instance, a share of a first n-bit random binary number and a plurality of function table segments; generating a share of a second n-bit random binary number; calculating a first value based on a comparison between the share of the first and second n-bit random binary numbers; reconstructs an overall value of a comparison between the first and second n-bit random binary numbers; and determining a share of the random noise value based on the overall value and the plurality of function table segments.

19 Claims, 5 Drawing Sheets

SAMPLING FROM BINOMIAL DISTRIBUTION IN SECURE MULTI-PARTY COMPUTATION

CLAIM OF PRIORITY

This application claims priority under 35 USC § 120 to the Patent Cooperation Treaty Application Serial No. PCT/CN2024/074509, filed on Jan. 29, 2024, the entire contents of which are hereby incorporated by reference.

BACKGROUND

This specification relates to generating random noise for use in data computation.

Secure multiparty computation techniques, typically denoted "MPC", allow parties to jointly evaluate a function with their private inputs without sharing those inputs with the other parties. Thus, the privacy of individual parties is protected from each other party of the joint computation. An example MPC protocol allows for a particular function on the private data of each party to be computed by each party without sharing their private information with any other party. For example, typical MPC protocols rely on secret sharing to obscure each party's private data from the other parties.

In some MPC scenarios, the function results can leak information about private inputs because of the nature of the computed function. To reduce the risk of private inputs being inferred from MPC results, differential privacy techniques can be employed as part of a given MPC protocol. Differential privacy can be achieved in MPC by introducing some random noise to the MPC results that masks individually identifiable information from the private data used to compute the MPC function.

SUMMARY

This specification describes technologies for generating random noise for use of performing an MPC process that incorporates differential privacy. The noise is generated using a random number generation that simulates Bernoulli sampling of a binomial distribution. The resulting noise can be introduced into the MPC result to provide differential privacy.

In particular, an offline-online model can be used in which an offline party, or parties, precompute some of the information for use by one or more online parties engaging in an instance of MPC.

The one or more offline parties generate a n-bit random binary number. The first n-bit random binary number is generated using a suitable random number generator, e.g., a cryptographically secure random number generator. The one or more offline parties further generate function table segments that can be provided to online parties. The function table segments relate the first n-bit random number generated by the one or more offline parties and all possible second n-bit random numbers, which can be subsequently generated by the online parties, e.g., during an MPC process between the online parties. The combination of these random numbers are used to generate function table segments that calculates a comparison between respective portions of the first n-bit random binary number and the second n-bit random binary number. For example, the comparison can be a value for a logical operator, e.g., an logical exclusive or, XOR, evaluated between respective portions of the first n-bit random binary number and a given second n-bit random binary number. The one or more offline parties further calculate a corresponding Hamming weight of the corresponding portion of the second n-bit random number. The overall Hamming weight of the second n-bit random number is also equivalent to an n-trial binomial sampling. This is because an n-bit random number is equivalent to n random coin flips since each bit value is randomly assigned a 0 or 1 value. So by computing the Hamming weight of the n-bit random number this adds up across all of the bits to provide a binomial sampling of n trials.

The function table can further be divided into a number of function table segments, or blocks. Moreover, the offline parties can directly generate the function table segments based on the first n-bit random binary number and the possible second n-bit random binary numbers without first building a single function table. In response to an initiation of an MPC process between two or more online parties, the offline parties can provide a respective share of a particular precomputed first n-bit random number and the collection of corresponding function table segments to each online party.

The online parties can use the information received from the one or more offline parties to determine, with only one round of communication between the online parties, a share of the random noise to use in the MPC process. In particular, the one or more online parties generate a second n-bit random binary number that simulates a binomial distribution of n-trials and a probability of 0.5. In other words, the online parties generate respective shares of a random binary number that simulates a sequence of n random coin flips.

Using the respective share of the first n-bit random number and a corresponding generated share of a second n-bit random number, the online parties can interact, in a single communication round, to derive the XOR value between the first n-bit random number and the second n-bit random number. Using the collection of function table segments, each online party can divide the XOR value into portions and use each portion to determine a corresponding portion of a share of the Hamming weight of the second n-bit random number. By summing the portions, each online party can generate an overall share of the Hamming weight of the second n-bit random number. This share can then be used to introduce random noise into the MPC results.

In general, one innovative aspect of the subject matter described in this specification can be embodied in methods for generating a random noise value that include the actions of: receiving, by a first party participating in a multiparty secure computation ("MPC") instance, a share of a first n-bit random binary number and a plurality of function table segments computed with respect to the first n-bit random binary number. The method also include receiving a computation request by the first party of two or more parties participating in the MPC instance, and in response to receiving the computation request: generating a share of a second n-bit random binary number; calculating a first value based on a comparison between the share of the first n-bit random binary number and the share of the second n-bit random binary number; sending the calculated first value to each other party participating in the MPC instance; receiving a respective second value from each other party participating in the MPC instance; reconstructing an overall value of a comparison between the first n-bit random binary number and the second n-bit random binary number using the calculated first value and the received second values; dividing the reconstructed overall value into sections and use each section to obtain a corresponding value of a Hamming weight corresponding to that section from the plurality of function table segments; and summing the Hamming weight values to determine overall Hamming weight of the second n-bit random binary number, which corresponds to a share of the random noise value. Other embodiments of this aspect include corresponding computer systems, apparatus, and computer programs recorded on one or more computer storage devices, each configured to perform the actions of the methods.

This specification uses the term "configured" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

In general, one innovative aspect of the subject matter described in this specification can be embodied in methods performed by an offline party that include the actions of generating a first n-bit random binary number; generating a plurality of function table segments based on the first n-bit random binary number and all possible values of second n-bit random binary number, wherein the plurality of function table segments include XOR values for portions of the first n-bit random binary number and a corresponding portion of the second n-bit binary number and Hamming weight values of the portion of the second n-bit random binary number; and providing, to each online component participating in a multiparty computation ("MPC") instance, a value associated with the first n-bit random binary number and the plurality of function table segments.

In general, one innovative aspect of the subject matter described in this specification can be embodied in a system that includes one or more offline components and one or more online components. The one or more online components configured to perform operations including: generating a first n-bit random binary number; generating a plurality of function table segments generated with respect to the first n-bit random binary number; and providing, to each online component participating in an MPC instance, a respective share of the first n-bit random binary number and the plurality of function table segments. The one or more online components jointly participating in the MPC instance configured to perform operations including: receiving a first share of the n-bit random binary number and the plurality of function table segments; generating a first share of a second n-bit random binary number; reconstructing an overall value of a comparison between the first n-bit random binary number and the second n-bit random binary number; using the plurality of function table segments to determine a share of a Hamming weight of the second n-bit random binary number; and using the share of the Hamming weight of the second n-bit random binary number in the MPC computation to introduce a random noise based on the Hamming weight to an MPC computation result.

The subject matter described in this specification can be implemented in particular embodiments so as to realize one or more of the following advantages. The offline precomputation provides a more efficient calculation of the random noise by the online parties. Dividing function tables into smaller blocks greatly reduces computation by the online parties to look up values. Furthermore, using the XOR as the key in the function table reduces complexity of the function tables. Typically, secret sharing uses addition, e.g., the sum of the secret shares equals the base value. However, additive sharing requires a more complex function table and cannot be simply divided into segments. For example, using additive shares can cause a carry bit added to the function bales increasing the size and computations requirements for computing and using the function table segments. Additionally, using the Hamming weight as the value to the XOR key, provides simple divisibility of the Hamming weight since separate portions can be simply summed to find the total Hamming weight. Thus, the use of XOR and Hamming weight provides for a less complex and divisible function table that can be easily shared with online parties and values obtained with low computation costs. Additionally, the function table segments are independent, and can be computed in parallel, while in additive sharing the more complex function table segment will also have some mutual dependence further increasing the computations needed. As a result, the online parties can quickly lookup Hamming weight values in the individual function table segments and sum the resulting Hamming weight values to determine an overall share of the Hamming weight to use in adding a random noise value to the MPC computation results.

Random noise can be generated by the online parties for use in MPC with low communication costs. The communication cost of the online phase is only one share reconstruction in one round, all the rest of the computation is local. This share has small size as being just a single XOR value, in contrast to other techniques that either require multiple rounds or more complex communication, e.g., binary circuits, or both. Moreover, for the offline phase, the computation is local as well so that all is sent is a random number share and a collection of reduced size function table segments.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
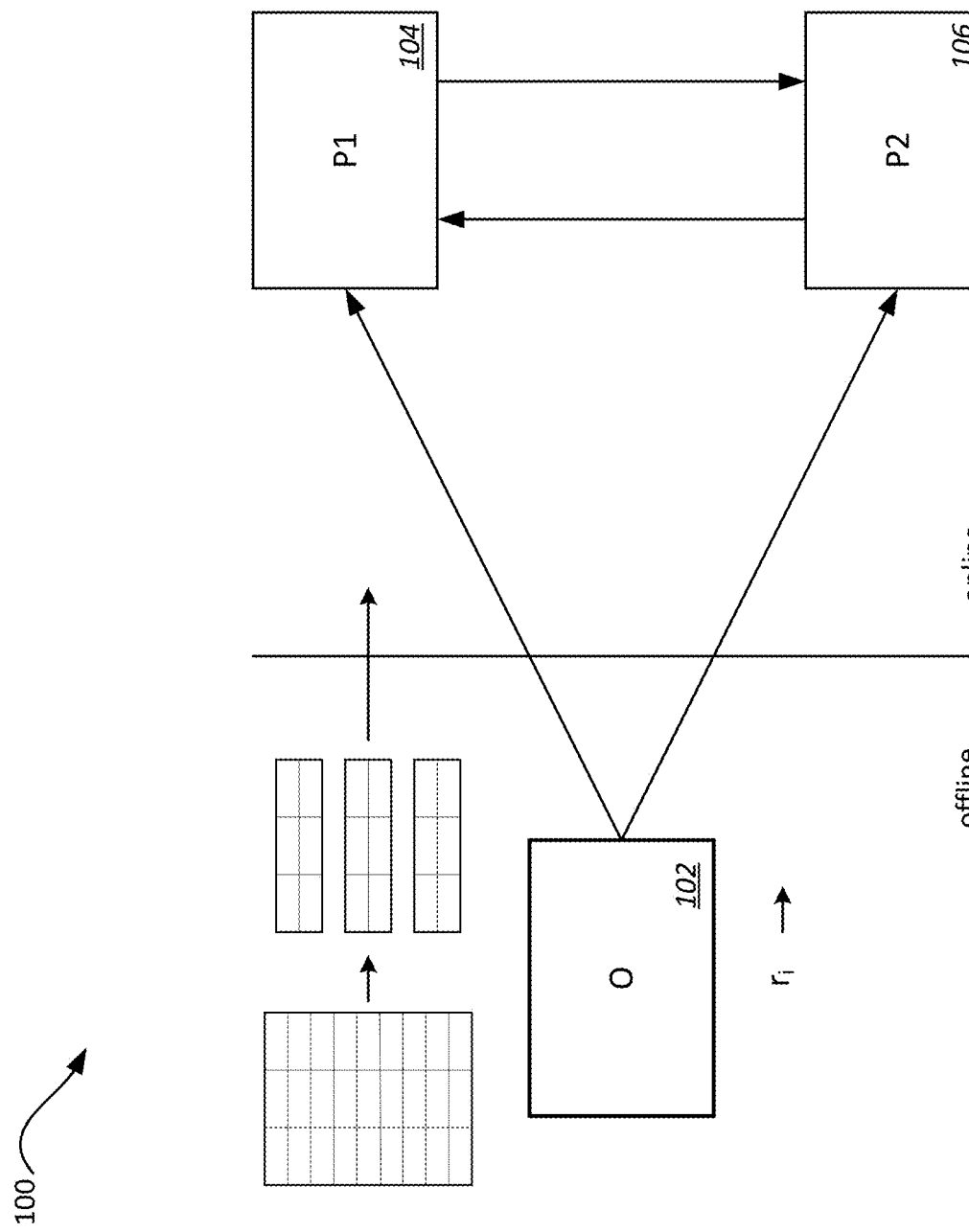
FIG. 1 shows an example system for MPC using an offline-online model.

MPC techniques allow parties to jointly evaluate a function with their private inputs without sharing those private inputs with the other parties. There are a number of different MPC techniques that can be used to provide the MPC. Typically, secret sharing is used to provide data privacy. As a simple illustrative example, assume a number of parties working for a company wish to find their average salary without revealing their own salary to any other party. The private data of each participant can be a number representing their salary. Each participant divides their salary into shares, referred to as secret shares. The shares can be random numbers with the constraint being that their sum is equal to the private data, i.e., their salary in this example. For example, if party 1 has an hourly salary of $10 per hour, the shares can be 1, 3, 4, 2, which sum to 10.

If there are four participants, each participant can divide their salary into four shares. The shares are then divided among the parties. Thus, each party has four shares: one of their shares and one share from each other party. By themselves the shares are meaningless random numbers. Each party then sums the values of their shares and reveals that sum to the other participants. Each party then has four sums, which also provides the sum of all the private data values, in other words, the sum of all the salaries. Knowing the total sum of salaries, the parties can then compute a particular function to operate on the salary information, e.g., divide by four and get the average salary, without the private salary information being revealed for any one party.

While MPC works to provide protection of private data used as input to the functions of the MPC, for some functions it is possible to infer some private data from the generated results based on the nature of the functions being computed. For example, large data sets can include information about many different users. Even with anonymization (e.g., removing names), it is possible to combine results generated from the seemingly anonymous data to identify individualized information. Differential privacy is a technique to reduce the probability of determining individualized private information from the MPC results without changing the outcome of the function being computed. Typically, this is done by introducing noise to individual data based on some distribution so that there is plausible deniability as to its accuracy, so that no individualized determinations can be made. However, because the distribution of the noise is known, it can be compensated for in the aggregate so that a correct final output is generated.

In a more general example, two entities may wish to compute functions based on large datasets of information. For example, one entity may be a social media entity with a large dataset of information relating to social media content or users. The second entity may be a content sponsor for the social media entity, an academic institution, or other entity. The social media entity needs to maintain the privacy of their dataset such that individualized information, e.g., about a particular user, cannot be obtained by the second entity. Using MPC, and in particular with differential privacy, allows the two entities to perform data analysis as part of evaluating various functions without providing any access to the private data outside of the respective entities and ensuring within the specified degree of differential privacy that the MPC outputs cannot identify any individualized information.

This specification describes technologies for generating a random noise value for use in providing differential privacy during an MPC interaction between two or more parties. In particular, this specification describes an offline-online model in which offline parties generate assistance information based on a first n-bit random binary number. The assistance information is used by two or more online parties to generate a share of random noise based on the Hamming weight of a second n-bit random binary number, which is equivalent to a binomial sampling of the second n-bit random binary number. The share of the random noise can be used to provide the differential privacy in the MPC result.

Offline-Online Model

FIG. 1 shows an example system 100 illustrating an offline-online model to generate a random noise value. The noise value can be generated for use in multiparty computation performed between different parties. For example, the noise value can be introduced to computation results in a manner that provides differential privacy in the MPC.

FIG. 1 includes an offline party 102 and two online parties 104 and 106. In some implementations, each party can represent a distinct entity or enterprise. The offline party 102 can compute assistance information used by the two online parties 104 and 106 to determine respective noise value shares for each online party. The offline party 102 may include one or more computers, servers, or other computing devices. One or more online parties may be associated with the offline party 102, or they may all be independent. While only two online parties are illustrated in FIG. 1, any suitable number of online parties can interact to perform MPC in a manner that requires the introduction of a noise value generated as described in this specification. The online parties may each include one or more computers, servers, or other computing devices. For example, a first online party may correspond to one or more computing devices associated with a first entity and the second online party may correspond to one or more computing devices associated with a second entity.

In particular, in an offline phase, the offline party 102 computes a random number r and splits r into share portions to provide to the online parties 104 and 106. The offline party 102 also generates a function table, or a collection of function table segments, based on the random number r, an unknown random number x generated by the online parties, and a Hamming weight of the random number x. In some implementations, the Hamming weight in the function table or function table segments is populated in the form of an additive secret shares for providing to online parties. For example, both r and x can be a binary number having a specified number of bits. The function table computes values based on r and all possible values of x having the specified number of bits. Thus, if x is a 6-bit binary digit, the possible values of x range from 000000 to 111111, or 26 possible values. For a large value of x, the function table can have a computationally unwieldy number of rows. For example, for a 64-bit value of x there are 264 rows of potential values for x. However, by separating the function table into a collection of segments, each function table segment can be more easily used, for example, the 264 function table can be segmented into 8 tables of size $2^8$ rows. The function table segmentation is described in greater detail below with respect to FIG. 2.

The offline party 102 can provide, to the online parties, assistance information responsive to an indication that online parties 104 and 106 are initiating MPC. This assistance information can include a share of r and the function table segments. The share of r is derived such that the evaluation of a particular logical operator, e.g., XOR, to the shares is equal to r. The logical operator can be a bitwise operation as well as one that can be used as for a random masking. For example, for two online parties, r is divided into $r_1$ and $r_2$ such that $r_1 \oplus r_2 = r$. In some alternative implementations, additive sharing is used. For example, for two online parties, r is divided into $r_1$ and $r_2$ such that $r_1 + r_2 = r$. The offline party 102 provides $r_1$ to online party 104 and $r_2$ to online party 106.

During an online phase, the online parties 104 and 106 receive the corresponding share of the offline generated random number r and the collection of function table segments. Through one round of communication between online parties 104 and 106, each online party, using the function table segments, is able to compute a share of a random noise value that simulates a binomial distribution sampling. The computation of the share of the noise value is described in greater detail below with respect to FIG. 3. This noise value can then be added to the MPC process to provide differential privacy as part of the computation. Performing MPC using the noise value is described below with respect to FIG. 4.

Offline Phase

Figure 2:
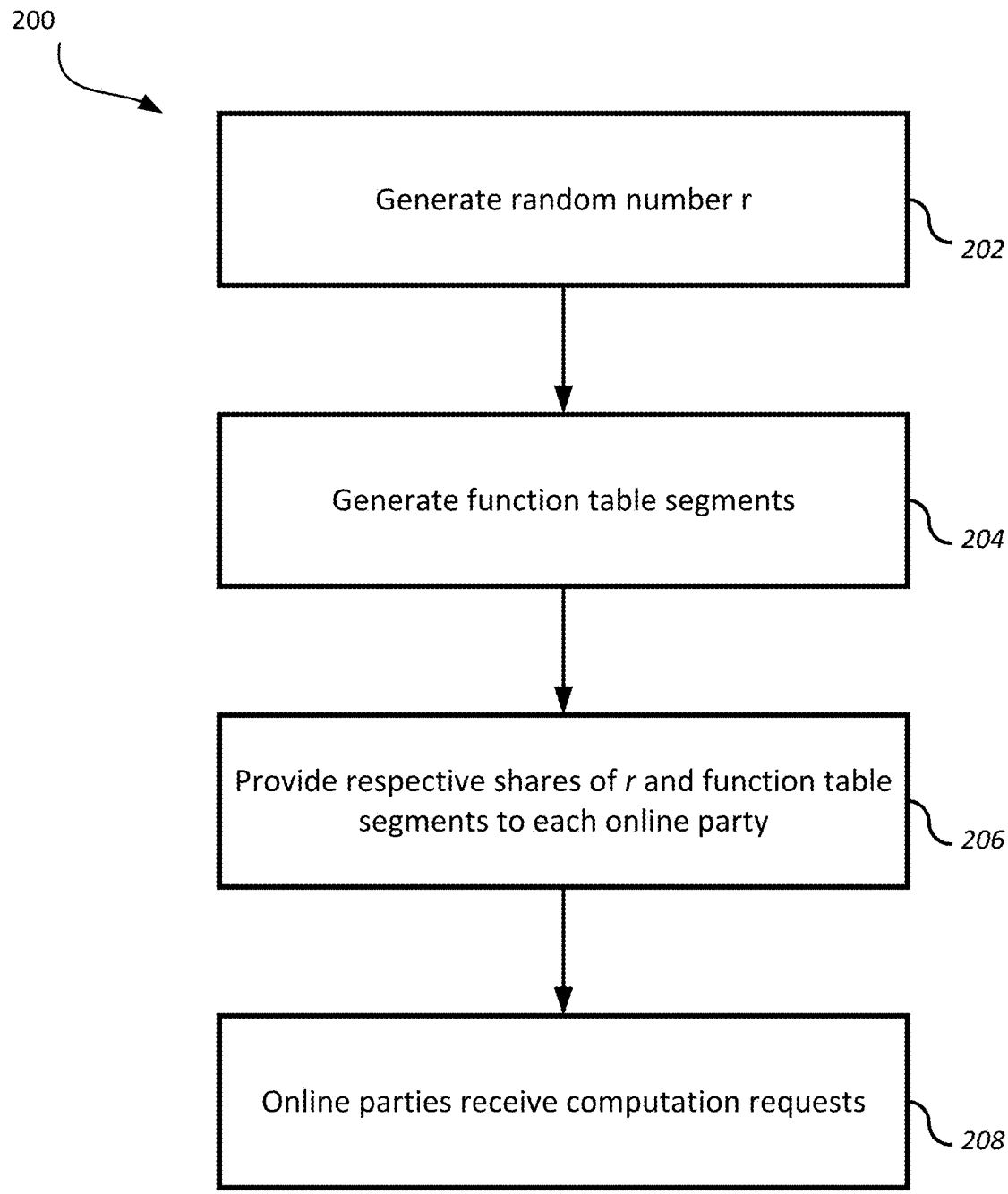
FIG. 2 is a flow diagram of an example process for performing the offline phase.

FIG. 2 is a flow diagram of an example process 200 for performing the offline phase. For convenience, the process 200 will be described as being performed by a system of one or more computers, located in one or more locations, and programmed appropriately in accordance with this specification. For example, an offline party of the system, e.g., the offline party 102 of FIG. 1, appropriately programmed, can perform the process 200.

The offline party generates an n-bit random binary number r (202). The random number r has a specified size, e.g., corresponding to a specified number of bits, established for offline and online parties. The size of r can depend on the use case, for example, for use in association with multiparty computation. Different techniques can be used to generate r. For example, for a given bit length, a suitable cryptographically secure random number generator can generate a value for r having the specified number of bits. For example, r can be a 64-bit number, e.g., a sequence of 64 digits where each digit is represented by either a binary value of 1 or 0.

Once the random number is generated, a function table for a Hamming weight is optionally generated. As described below, in some implementations, the full table is not generated, but instead a collection of function table segments are generated. The Hamming weight of a binary number corresponds to the number of bits in the number that have a value of "1" versus a value of "0". For example, the Hamming weight (HW) of the 8-bit number 10101101 is the sum of the number of instances of "1" in the 8-bit number, or HW=5.

The function table calculates, for each potential random number x, a key corresponding to a comparison evaluated between x and r, e.g., x XOR r, and a value corresponding to the Hamming weight of x. The random number x corresponds to a random number generated by the online parties and is unknown to the offline party. However, the number of bits for the random number is known. As such a table can be generated in which there is a row for each possible value of x. For example, if x is the 8-bit number 10101101, the rows correspond to each possible 8-bit number, e.g., from 00000000, 00000001, . . . , 11111110, 11111111. For an 8-bit number this corresponds to $2^8$ possibilities or 256 row entries.

The value of x XOR r, also denoted x⊕r, is a logical operator called the exclusive or, whose negation is the logical biconditional. In other words, it is "true" when x and r are different and false when x and r are the same. An example truth table of x⊕r as single bit values is shown below in Table 1.

TABLE 1

| x | r | x ⊕ r |
|---|---|-------|
| 0 | 0 | 0 |
| 1 | 0 | 1 |
| 0 | 1 | 1 |
| 1 | 1 | 0 |

For multi-bit values of x and r, x⊕r can be calculated by determining whether each of the corresponding bits between the two numbers is the same or different. For example, for x=101 and r=011 the value of x⊕r=110.

Finally, the Hamming weight for x is computed for each row of the function table. As described above, the Hamming weight of a binary number corresponds to the number of bits having value 1. Therefore, for x=binary 10 the Hamming weight is 1 while for x=binary 11 the Hamming weight is 2. In some implementations, the Hamming weight values are not recorded in the table in plaintext, but are in a secret share form denoted by brackets, e.g., the Hamming weight of x=11 is represented as [2].

Table 2 provides a simple example of a function table for all 2-bit values of x where r=10.

TABLE 2

| x (all possible 2-bit segments) | x ⊕ r, r = 10 | HW (x) (secret share of HW) |
|---|---|---|
| 0 0 | 1 0 | [0] |
| 0 1 | 1 1 | [1] |
| 1 0 | 0 0 | [1] |
| 1 1 | 0 1 | [2] |

The resulting table size increases exponentially with the size of the random number. For example, a 64 bit number has 264 possible values, equal to 18,446,744,073,709,551,616, which becomes unwieldy for use as a look-up table due to the computational load.

However, due to the particular nature of having the Hamming weight as the value, the function table can be split into more computationally manageable segments or blocks. In particular, since the Hamming weight is a simple sum of the number of instances of value 1, the binary values can be split into smaller portions without changing the sum of the Hamming values from the value in the table as a whole.

For example, for an 8-bit value of x=10101101 the Hamming weight is 5 since there are 5 "1's" in x. If x is separated into two bit chunks, in other words, 10, 10, 11, and 01 and the Hamming weight calculated for each, results in, respectively, 1, 1, 2, and 1 that when added together is again equal to 5.

Based on this property of Hamming weight, the system generates a collection of function table segments (204). For example, a large function table can be split into smaller segments corresponding to portions of the bit value of r. In one example implementation, r is split into m k-bit pieces and the corresponding possible k-bit x values are used to populate a function table segment. If r is a 64-bit number it can be split into 8 8-bit sections, which reduces the size of each function table segment to $2^8$ rows, which can be readily used for real time lookup without overtaxing computational resources. Additionally, the function table segments can be further simplified because only the XOR and Hamming weight columns are needed, and the values of x are not used by the online parties. Therefore, only two columns are needed in each function table segment. Furthermore, the function table segments are independent due to the use of XOR and Hamming weight. As a result, the function table segments can be generated in parallel.

In some implementations, the collection of function table segments can be generated directly, without an intermediate step of creating the full single function table. In particular, because of the properties of the Hamming weight, by knowing the value of r and possible values of x, the function table segments can be directly generated with columns for $x \oplus r$ and Hamming weight based on a specified number of segments, e.g., determined according to the bit size of r.

The system provides respective shares of r and the function table segments to each online party (206). The system splits r into shares of r to provide to each online party. For example, the shares can be created so that the XOR of the shares is equal to r, e.g., $r_1 \oplus r_2 = r$. In particular, in some implementations, the shares are in secret share form, so that $r_1$ and $r_2$ represent secret shares of r. Finally, in some implementations, rather than being XOR shares, the shares can be additive shares of r, e.g., $r_1 + r_2 = r$.

The function table segments can be provided in plain text or as secret shares. However, in some implementations the value for the Hamming weight of x can be in secret form even if the other column information is provided in plain text. Additionally, although the function table as a whole may be generated with columns for x, $x \oplus r$, and the hamming weight (x), only the latter two are needed for the lookup by the online parties. Thus, the function table segments can be limited to those columns in addition to each segment corresponding to a particular bit portion of r.

The offline party does not need to know anything about the nature of the function being computed or private data from any online party. Furthermore, the offline party does not need to know the value of x since the function tables contemplate all possible values of x. The offline party only needs to provide the assistance information, namely shares of r and the function table segments, to the online parties.

After the system provides the assistance information to the online parties, the online parties can receive computation requests (208), which then proceed with the online phase described below with respect to FIG. 3.

The offline process can be further represented by the following example algorithm:

---

Algorithm: Offline phase of Hamming weight process

---

Output: :[r], XOR share of random number r, and function table segments denoted: $\{F_i\}_{i \in \{1,...,m\}}$ 1  Offline party randomly samples $r_1, r_2 \leftarrow Z_2 \ell$, and used $r_1, r_2$ as XOR shares of value $r = r_1 \oplus r_2$.
2  Cut r into m k-bit pieces sych that $\ell = km$. Denote the i-th piece by $\overline{r_i}$.
3  
4  | for $j \leftarrow \{1, 2, ..., 2^k\}$ do
5  | | $F_i(j)$ = Hammering Weight($j \oplus \overline{r_i}$).
6  Send $r_i$ to online parties as the XOR shares of value r.
7  Additively share all function tables $\{F_{i,j}\}_{i \in \{1,...,m\}}$ to online parties.

---

At (1) the random number is generated through a process that simulates a random distribution and the random number is separated into shares, in this case XOR shares.

At (2)-(5) the random number is divided into particular bit segments that can then be the basis of generating corresponding function table segments.

At (6)-(7) the respective share of the random number and the function table segments are provided to the requesting online parties.

In some implementations, the offline precomputation of the function tables includes generating multiple random numbers r. Function tables, and function table segments, are generated for each of the random numbers. Thus, there can be a repository of offline generated function table segments for corresponding random numbers ready to use with online parties upon request. In such implementations, the offline party can select a particular random number and corresponding function table segments. The selection of a particular pre-generated r can be random, pseudo random, or according to any suitable selection process.

In addition, the value of n, i.e., the bit-size of the random numbers, can be predefined based on a particular differential privacy strength. As such, the parties can determine or agree on a particular n before any online phase execution.

Online Phase

Figure 3:
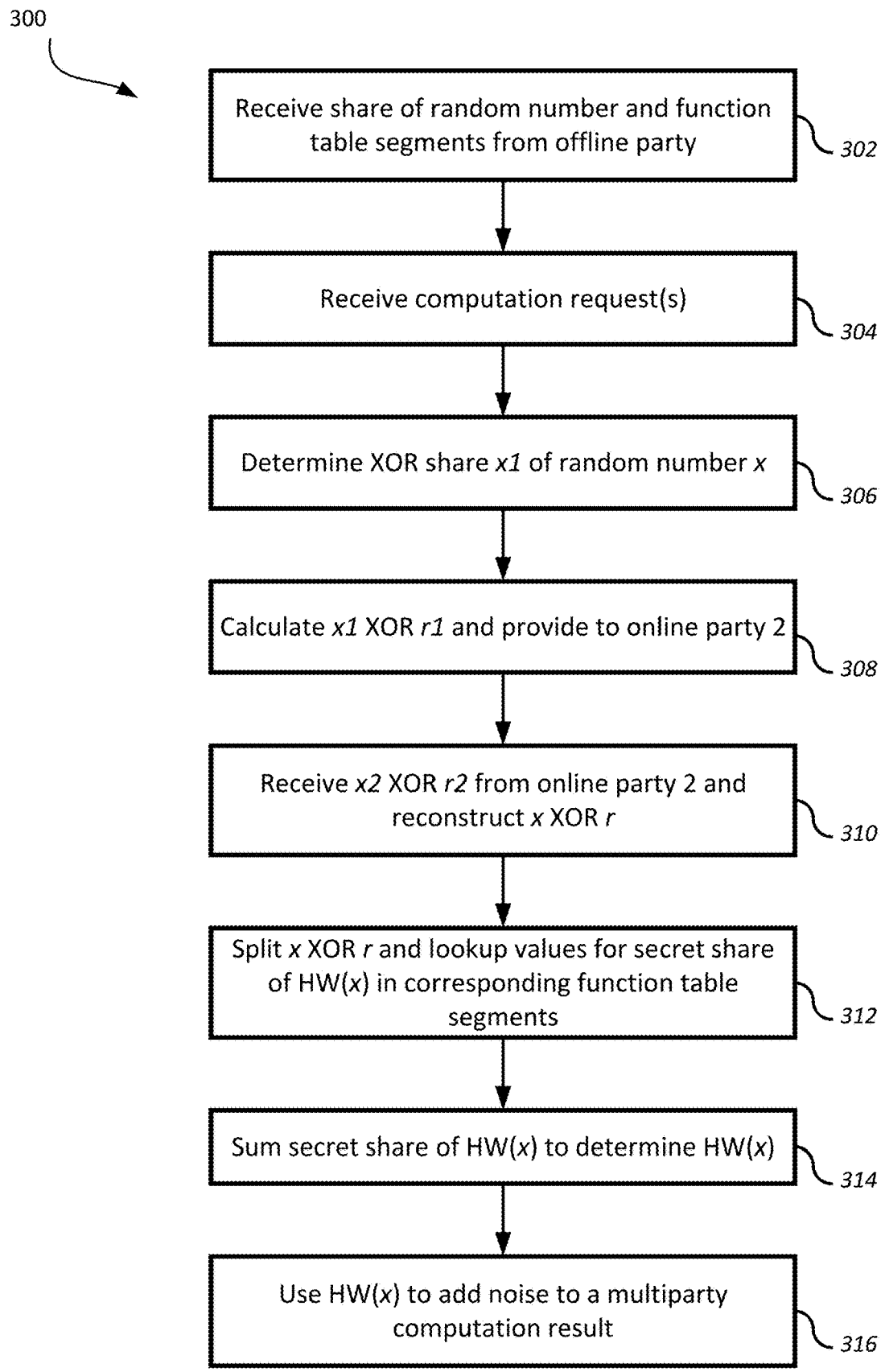
FIG. 3 is a flow diagram of an example process for performing the online phase.

FIG. 3 is a flow diagram of an example process 300 for performing the online phase. For convenience, the process 300 will be described as being performed by a system of one or more computers located in one or more locations, and programmed appropriately in accordance with this specification. For example, one or more online parties of the system, e.g., the online parties 104, 106 of FIG. 1, appropriately programmed, can be used to perform the process 300.

For convenience, the process 300 is described with respect to interactions between a first online party and a second online party. However, the process is similar for any suitable number of online parties.

The first online party receives, from the offline party, a secret share of a random number r denoted $r_1$, and a collection of function table segments (304). The random number r and function table segments can be generated by the offline party in a similar manner to that described above with respect to FIG. 2. As described above, the function table segments provide lookup tables for key, value pairs where the key corresponds to $x \oplus r$ and the value corresponds to the Hamming weight of random number x. As an example, the original function table may be based on a 64-bit value of r. To aid in use by the online users, this can be segmented into function table segments each keyed to 8-bit chunks of r such that every possible value of $x \oplus r$ is found within the collection of function table segments.

The online parties receive computation requests (304). The computation requests can include a request to evaluate a particular function using private data held by one or more of the online parties, but without providing the private data directly to any other online party.

The first online party determines a share of a particular n-bit random binary number. In particular, the first online party determines an XOR share $x_1$ of a particular random number x (306). In some implementations, x can be generated using a binomial distribution where p=0.5 such that each sampling has a 50% probability of being either 1 or 0. For example, a binomial distribution of 64 trials with a probability of p=0.5, is essentially a distribution of 64 coin flips where some flips result in tails (e.g., 0) and heads (e.g., 1). If the individual results are used to form a string, it is a random sequence of 0's and 1's having a total of 64 digits.

However, in some other implementations, x can instead be generated in batch form rather than accumulating individual Bernoulli trials. For example, a 64-bit random number can be generated, which again corresponds to a 64 digit sequence of 0's and 1's with each bit chosen at random with a p=0.5 of being zero or 1. Thus, each bit corresponds to a "coin flip" but the entire sequence is generated at once instead of by summing independent trials.

In the example where there are two online parties, $x_1$ generated by a first online party and $x_2$ generated by a second online party can be XOR'd to construct x. For example, each party can generate a random number having a particular bit size, e.g., 64 bits. Each party's random number $x_1$ is a share of the overall random number x where each $x_1$ is a 64-bit number that when XOR'd provides x, i.e., for two shares $x_1 \oplus x_2 = x$. As noted above, this is a similar process with more than two parties. For example, with four parties it is $x=x_1 \oplus x_2 \oplus x_3 \oplus x_4$ and so on for additional online parties. One important note is that the shares of x and r should be consistent, that is, if the shares of x are XOR shares than the shares of r are also XOR shares for the computations to be correct.

The first online party performs a comparison between the share of the second n-bit random binary number and the share of the first n-bit random binary number. The comparison can be the evaluation of a logical operator. For example, in some implementations, the first online party computes $x_1 \oplus r_1$ and provides the result to each other online party (308). Again, for simplicity, with two online parties the first online party computes $x_1 \oplus r_1$ corresponding to the share of the random number x generated by the first online party XOR'd with the received share of the random number r.

The first online party receives similar results from the other online parties and uses the results to reconstruct $x \oplus r$ (310). Referring back to the two party example, the second online party computes $x_2 \oplus r_2$ and provides the result to the first online party. Consequently, the first online party (and also the second online party) has both $x_1 \oplus r_1$ and $x_2 \oplus r_2$. These values can be used to compute $x \oplus r$. In particular, $x \oplus r = (x_1 \oplus r_1) \oplus (x_2 \oplus r_2)$.

The first online party splits $x \oplus r$ into portions and uses each portion to perform a lookup in each of the function table segments (312). For example, $x \oplus r$ may be a 64-bit number that is split into 8-bit segments, e.g., first 8-bits, second 8-bits, etc. Each of these smaller 8-bit segments can be used as a key in a (key, value) lookup of one of the received function table segments. For each bit segment, the first online party looks up and retrieves corresponding secret share values of the Hamming weight of x. In some implementations, the values of n and the number of segments are predefined by the parties and available to all parties so that the generated n-bit random binary numbers are consistent with each other and so that is split into the correct number of portions for use with the function table segments.

To take a simple example where $x \oplus r$ is an 8-bit number such as r=10110001, there could be four function table segments each based on a 2-bit section of r. Thus, a first function table segment can be based on $r_a$=10, the second $r_b$=11, the third $r_c$=00 and the fourth $r_d$=01. As shown in Table 2, above, each 2-bit $x \oplus r$ value corresponds to a secret share of the Hamming weight of [x]. Based on these four 2-bit sections, four corresponding Hamming weight shares are determined, e.g., HW $(x_a)$=[0], HW $(x_b)$=[2], HW $(x_c)$=[1], HW $(x_d)$=[1].

The online party sums the individual shares of the Hamming weight obtained from the function table segments to determine an overall secret share of the Hamming weight of x (314). Because the Hamming weight relates to a count value, a simple sum of the individual shares equals the overall share of the Hamming weight for x. In the example, the result is the sum of [0]+[2]+[1]+[1], which equals [4].

The secret share of the Hamming weight of x can then be used in adding noise to a multiparty computation result (316). Adding the random noise to the MPC results can provide a statistically defined degree of differential privacy in the generated results so that the probability of determining any individualized data as part of any party's private data is decreased.

The online phase process can be further represented by the following example algorithm:

---

Algorithm 2: Online phase of hamming weight protocol

Precomputation [offline]: [r], XOR share of a random number r, and $\{F_i\}_{i \in \{1,...,m\}}$
Input : [x], and XOR share of the value x
Output : [y] where [y] is the additive share of the Hamming weight
 of value x
1 Both parties compute and reveal $[x \oplus r] = [x] \oplus [r]$.
2 Cut $x \oplus r$ into m k-bit pieces such that $\ell = km$. Denote the i-th piece by $(x \oplus r)_i$.
3 for i ← {1, 2, ... , m} do
4  $\lfloor [y_i] = F_i((x \oplus r)_i)$
5 $[y] = \Sigma_{i=1}^{m} [y_i]$

---

At (1) the value of $x \oplus r$ is reconstructed from the individual shares of $x_i \oplus r_i$.

At (2)-(4) $x \oplus r$ is divided into segments and used to look up Hamming weight secret share values in the collection of function tables segments.

At (5) the Hamming weight shares are summed to determine an overall Hamming weight share.

As described, only one round of communication is needed between the online parties during the online phase. Additionally, the online parties are only sharing a single number corresponding to a respective value of $x_i \oplus r_i$. For example, in the case of a 64-bit number, the communication of data between the online parties is just 64-bits each. The communication costs for the offline portion to provide the function table segments is based on the size of all the function table segments, which can be descried as $m2^k$ where m is the number of segments and k is the size in bits of the portion of the random number used in each segment. Thus, for example, for a 64-bit random number r divided into eight 8-bit segments, the communication cost for sending the function table segments is equal to (8) $2^8$.

Introducing Random Noise in MPC

Figure 4:
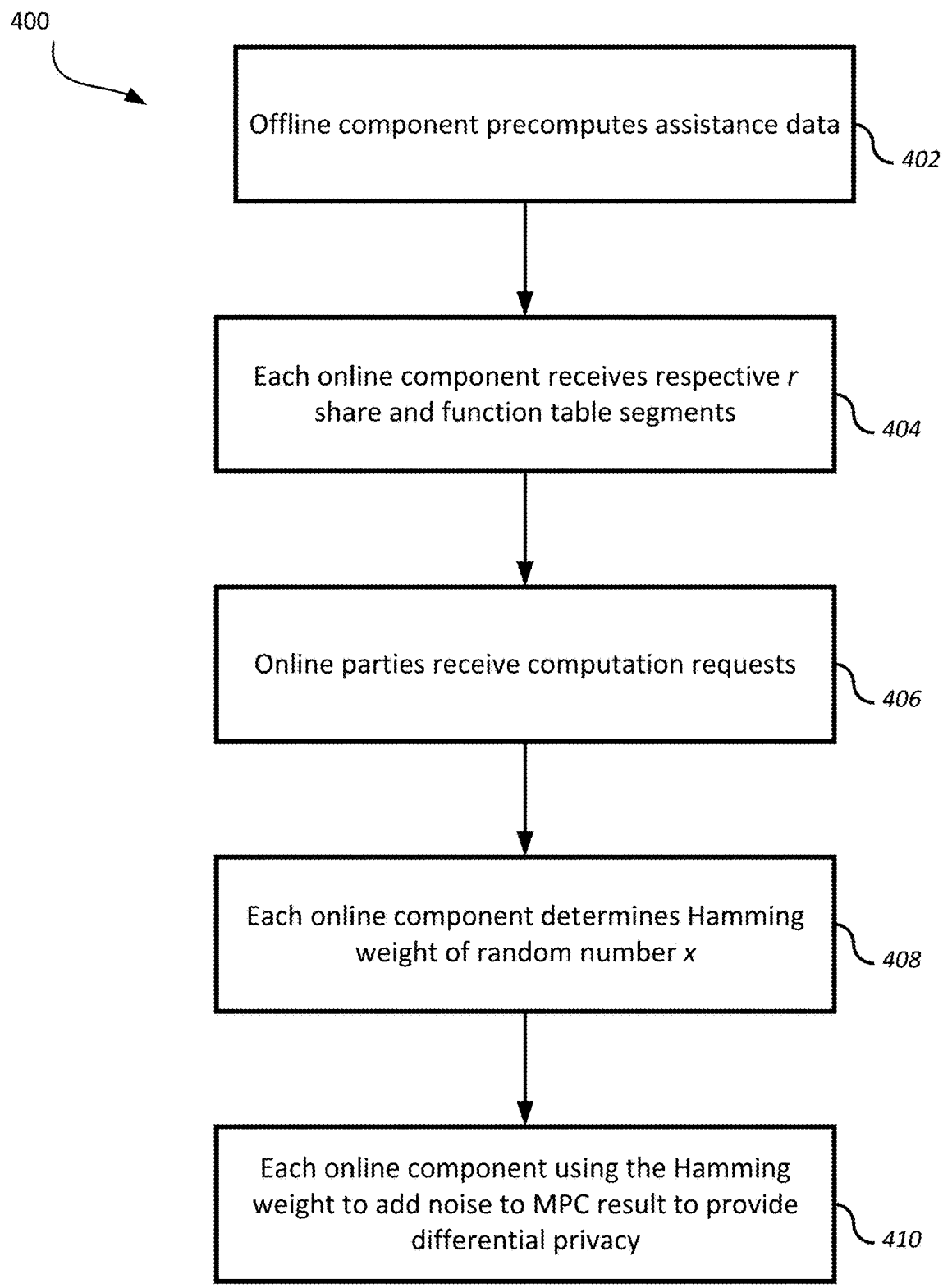
FIG. 4 is a flow diagram of an example process for multiparty computation.

FIG. 4 is a flow diagram of an example process 400 for multiparty computation. For convenience, the process 400 will be described as being performed by a system of one or more computers, located in one or more locations, and programmed appropriately in accordance with this specification. For example, the offline and online components of a system, e.g., the system 100 of FIG. 1, appropriately programmed, can be used to perform the process 400. Additionally, while FIG. 4 often references two online parties for ease of understanding, this is similarly applicable to more than two online parties by having additional XOR shares of the n-bit random binary numbers corresponding to the number of online parties.

During an offline phase, the offline components precompute assistance data for use by online parties (402). For example, as described above with respect to FIG. 2, the assistance data can include a value for a random number r and associated function table. Additionally, the function table can be keyed to an XOR value of r and a random number x to be generated by the online parties during an online phase. The corresponding values of the function table can be a value for the Hamming weight of each possible x. The function table can be divided into a collection of function table segments.

Each of the two or more online components receive a respective secret share of a random number r and a collection of function table segments (404). For example, as described above with respect to FIGS. 2-3, the random number r is divided by the offline party into respective shares for each online party. For example, for a two party computation, r is divided into two secret shares $r_1$ and $r_2$. The secret share $r_1$ is provided to the first online party and the secret share $r_2$ is provided to the second online party. Both online parties receive the collection of function table segments.

The two or more online components receive computation requests (406). For example, the online components can represent two or more parties that compute a function whose inputs are based on private data held by the respective parties. Using MPC, each party seeks to compute the function without revealing their private data to any other party. To further secure the private data, the MPC protocol selected for use between the online components can include a noise generating procedure as described in this specification that provides a specified measure of differential privacy.

Each online component determines a Hamming weight of the randomly generated number x using a share of x generated by each online component, the received share of the random number r, and the collection of function table segments (408). Each online component reconstructs $x \oplus r$ from their respective shares of r and x and from $x \oplus r$ values received from other online parties for their respective shares. The collection of shares allows for the complete reconstruction of $x \oplus r$, which is divided into segments and used to look up Hamming weight shares in the collection of function able segments. The Hamming weight shares are summed to generate a total Hamming weight share.

The online components, respectively, use the Hamming weight of x to introduce noise into their multiparty computation results, which provides differential privacy for het multiparty computation (410). In particular, the Hamming weight of x essentially corresponds to a random noise generated through a random sampling of a binomial distribution. This noise is added by the MPC computation to the output such that any outliers from the individual private data of the other parties that could reveal specific private information is obscured from the output result of the MPC.

Figure 5:
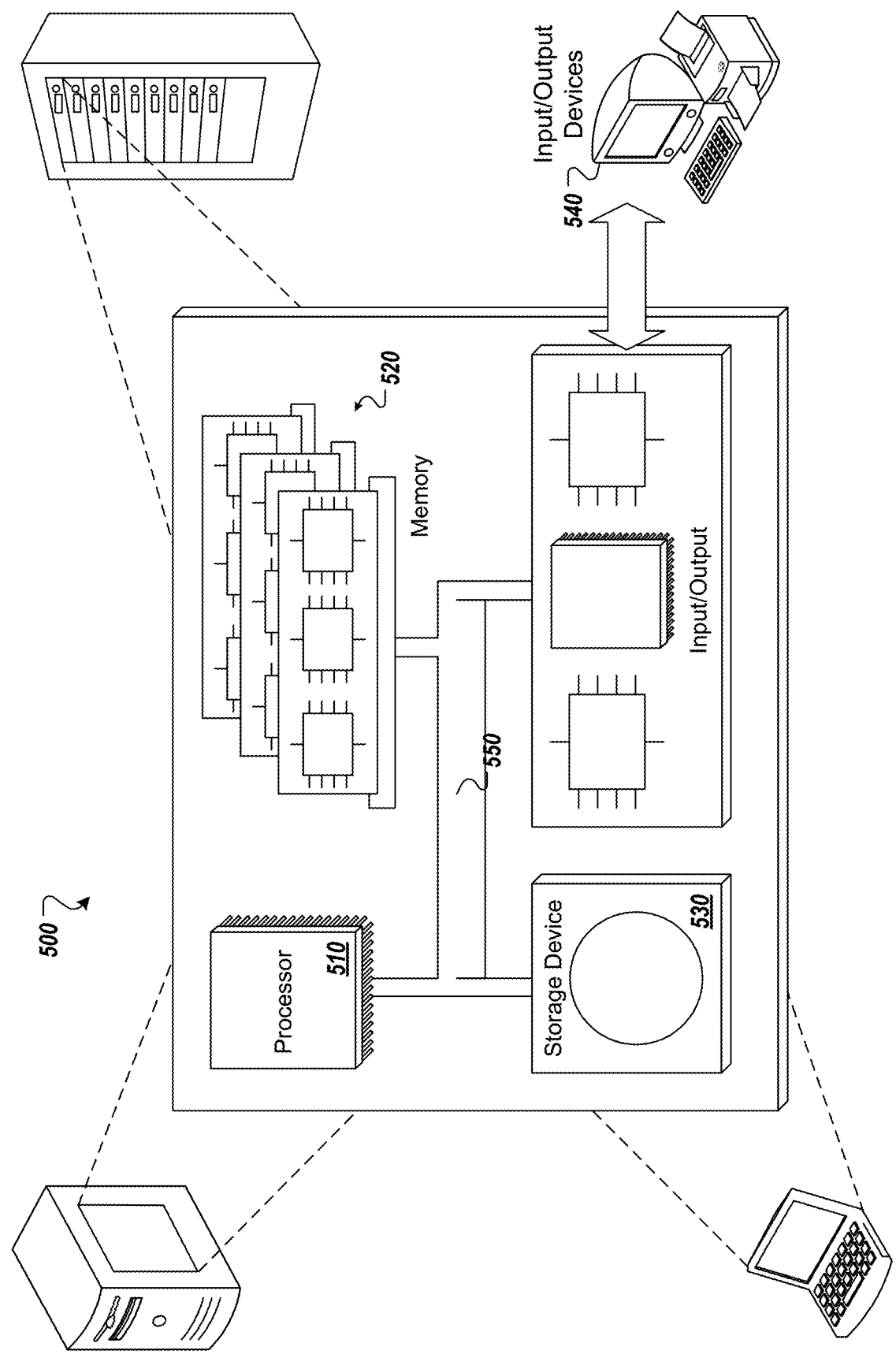
FIG. 5 illustrates a schematic diagram of an example computing system.

FIG. 5 illustrates a schematic diagram of an example computing system 500. The system 500 can be used for the operations described in association with the implementations described herein. For example, the system 500 may be included in computing devices of the one or more online components and/or the one or more offline components. The system 500 includes a processor 510, a memory 520, a storage device 530, and an input/output device 540. The components 510, 520, 530, and 540 are interconnected using a system bus 550. The processor 510 is capable of processing instructions for execution within the system 500. In some implementations, the processor 510 is a single-threaded processor. The processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 can be a volatile memory unit or a non-volatile memory unit. The storage device 530 is capable of providing mass storage for the system 500. The storage device 530 is a computer-readable medium. The storage device 530 may be a floppy disk device, a hard disk device, an optical disk device, or a tape device. The input/output device 540 provides input/output operations for the system 500. The input/output device 540 includes a keyboard and/or pointing device. The input/output device 540 includes a display unit for displaying graphical user interfaces.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following embodiments are also innovative:

Embodiment 1 is a method for generating a random noise value, the method comprising: receiving, by a first party participating in a multiparty secure computation ("MPC") instance, a share of a first n-bit random binary number and a plurality of function table segments computed with respect to the first n-bit random binary number; and receiving a computation request by the first party of two or more parties participating in the MPC instance and in response to the computation request: generating a share of a second n-bit random binary number; calculating a first value based on a comparison between the share of the first n-bit random binary number and the share of the second n-bit random binary number; sending the calculated first value to each other party participating in the MPC instance; receiving a respective second value from each other party participating in the MPC instance; reconstructing an overall value of a comparison between the first n-bit random binary number and the second n-bit random binary number using the calculated first value and the received second values; dividing the reconstructed overall value into sections and use each section to obtain a corresponding value of a Hamming weight corresponding to that section from the plurality of function table segments; and summing the Hamming weight values to determine overall Hamming weight of the second n-bit random binary number, which corresponds to a share of the random noise value.

Embodiment 2 is the method of embodiment 1, wherein obtaining the corresponding value of the Hamming weight using the function table segments comprises: for each section of the overall value: using the section of the overall value as a key for the function table segments, wherein each function table segment includes a first column corresponding to sections of the overall value and a second column corresponding to a Hamming weight of a corresponding section of the second n-bit random binary value; and retrieving the value of the Hamming weight corresponding to the section of the overall value.

Embodiment 3 is the method of any one of embodiments 1 through 2, wherein the comparison is based on evaluation of an exclusive OR logical operator.

Embodiment 4 is the method of any one of embodiments 1 through 3, further comprising: joining the MPC instance with two or more other parties; and receiving the share of the first n-bit random binary number in response to communication of parties participating in the MPC instance to a second party.

Embodiment 5 is the method of any one of embodiments 1 through 4, further comprising: using the share of the random noise value to introduce noise into MPC results generated as part of the MPC instance prior to sharing the MPC results with any other party participating in the MPC instance Embodiment 6 is the method of any one of embodiments 1 through 5, wherein the received respective second values from each other party correspond to values calculated from respective comparisons performed between corresponding shares of the first n-bit random binary number sent to each other party and corresponding shares of the second n-bit random binary number generated by each other party.

Embodiment 7 is the method of any one of embodiments 1 through 6, wherein the random noise is generated with only a single round of communication with the other parties participating in the MPC instance.

Embodiment 8 is the method of any one of embodiments 1 through 7, wherein values of the Hamming weight obtained from the function table segments are in secret share form Embodiment 9 is the method of any one of embodiments 1 through 8, wherein dividing the reconstructed overall value into sections comprises dividing the reconstructed overall value into sequential sections of equal bit length.

Embodiment 10 is a method, the method comprising: generating a first n-bit random binary number; generating a plurality of function table segments based on the first n-bit random binary number and all possible values of second n-bit random binary number, wherein the plurality of function table segments include XOR values for portions of the first n-bit random binary number and a corresponding portion of the second n-bit binary number and Hamming weight values of the portion of the second n-bit random binary number; and providing, to each online component participating in a multiparty computation ("MPC") instance, a value associated with the first n-bit random binary number and the plurality of function table segments.

Embodiment 11 is the method of embodiment 10, wherein the Hamming weight values are in secret share form while the XOR values are in plain text form.

Embodiment 12 is the method of any one of embodiments 10 through 11, wherein generating the plurality of function table segments comprises dividing the first n-bit random number into equal sized bit portions and generating a function table segment for each bit portion.

Embodiment 13 is the method of any one of embodiments 10 through 12, wherein each function table segment of the plurality of function table segments is generated in parallel.

Embodiment 14 is the method of any one of embodiments 10 through 13, wherein each function table segment comprises a first column corresponding to the XOR values for corresponding portions of the first and second n-bit random binary numbers and a second column corresponding to Hamming weight values of the corresponding section of the second n-bit random binary number, wherein rows of the first column and the second column form a plurality of (key, value) pairs.

Embodiment 15 is the method of any one of embodiments 10 through 14, wherein an overall share of the Hamming weight of the second n-bit random binary number can be reconstructed by summing shares of the Hamming weight corresponding to portions of the XOR values of the first n-bit random binary number and the second n-bit random binary number.

Embodiment 16 is a system for generating a random noise value for multiparty computation (MPC), the system comprising: one or more offline components comprising one or more computers and one or more storage devices storing instructions that are operable, when executed by the one or more computers, to cause the one or more offline components to perform operations comprising: generating a first n-bit random binary number; generating a plurality of function table segments generated with respect to the first n-bit random binary number; and providing, to each online component participating in an MPC instance, a respective share of the first n-bit random binary number and the plurality of function table segments; and one or more online components jointly participating in the MPC instance, the one or more online components comprising one or more computers and one or more storage devices storing instructions that are operable, when executed by the one or more computers, to cause each of the one or more online components to respectively perform operations comprising: receiving a first share of the n-bit random binary number and the plurality of function table segments; generating a first share of a second n-bit random binary number; reconstructing an overall value of a comparison between the first n-bit random binary number and the second n-bit random binary number; using the plurality of function table segments to determine a share of a Hamming weight of the second n-bit random binary number; and using the share of the Hamming weight of the second n-bit random binary number in the MPC computation to introduce a random noise based on the Hamming weight to an MPC computation result.

Embodiment 17 is the system of embodiment 16, wherein reconstructing the value of the comparison between the first n-bit random binary number and the second n-bit random binary number comprises: calculating a first value based on a comparison between the received first share of the n-bit random binary number and the generated first share of the second n-bit random binary number; and receiving respective second values from each other online party, each second value corresponding to a comparison between respective shares of the first n-bit random binary number received by each other online component and respective shares of the second n-bit random binary numbers generated by each other online party.

Embodiment 18 is the system of any one of embodiments 16 through 17, wherein using the plurality of function table segments to determine a share of the Hamming weight of the second n-bit random binary number comprises: dividing the reconstructed overall value into sections and use each section to obtain a corresponding value of the Hamming weight corresponding to that section from the plurality of function table segments; and summing the Hamming weight values obtained from the function table segments.

Embodiment 19 is the system of any one of embodiments 16 through 18, wherein generating the plurality of function table segments comprises: dividing the n-bit random number into sequential, equal sized bit portions and generating a function table segment for each bit portion; and generating, in parallel, a respective function table segment for each portion of the first n-bit random binary number such that each function table segment comprises a column of values corresponding to values based on a comparison between corresponding portions of the first and second n-bit random binary numbers and a second column of Hamming weights of the corresponding section of the second n-bit random binary number.

Embodiment 20 is the system of any one of embodiments 16 through 19, wherein the Hamming weights of each function table segment are in secret share form while the values corresponding to the comparison between corresponding portions of the first and second n-bit random binary numbers are in plain text.

Embodiment 21 is the system of any one of embodiments 16 through 20, wherein the comparison is based on evaluation of an exclusive OR logical operator.

Embodiment 22 is the system of any one of embodiments 16 through 21, wherein the online parties comprise a social media entity and a second entity, wherein the MPC is used to evaluate one or more functions associated with datasets of one or more of the social media entity or the second entity without providing access to the private data of the datasets to the other online party.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for generating a random noise value comprising:
receiving, by a first party participating in a multiparty secure computation ("MPC") instance, a share of a first n-bit random binary number and a plurality of function table segments computed with respect to the first n-bit random binary number;
receiving a computation request by the first party of two or more parties participating in the MPC instance, and in response to receiving the computation request:
generating a share of a second n-bit random binary number;
calculating a first value based on a comparison between the share of the first n-bit random binary number and the share of the second n-bit random binary number;
sending the calculated first value to each other party participating in the MPC instance;
receiving a respective second value from each other party participating in the MPC instance;
reconstructing an overall value of a comparison between the first n-bit random binary number and the second n-bit random binary number using the calculated first value and the received second values;
dividing the reconstructed overall value into sections and use each section to obtain a corresponding value of a Hamming weight corresponding to that section from the plurality of function table segments, wherein for each section of the overall value:
using the section of the overall value as a key for the function table segments, wherein each function table segment includes a first column corresponding to sections of the overall value and a second column corresponding to a Hamming weight of a corresponding section of a second n-bit random binary value; and
summing Hamming weight values to determine overall Hamming weight of the second n-bit random binary number, which corresponds to a share of the random noise value.

2. The method of claim 1, wherein obtaining the corresponding value of the Hamming weight using the function table segments comprises:
for each section of the overall value:
retrieving the corresponding value of the Hamming weight corresponding to the section of the overall value.

3. The method of claim 1, wherein the comparison is based on evaluation of an exclusive OR logical operator.

4. The method of claim 1, further comprising:
joining the MPC instance with two or more other parties; and
receiving the share of the first n-bit random binary number in response to communication of parties participating in the MPC instance to a second party.

5. The method of claim 1, further comprising:
using the share of the random noise value to introduce noise into MPC results generated as part of the MPC instance prior to sharing the MPC results with any other party participating in the MPC instance.

6. The method of claim 1, wherein the received respective second values from each other party correspond to values calculated from respective comparisons performed between corresponding shares of the first n-bit random binary number sent to each other party and corresponding shares of the second n-bit random binary number generated by each other party.

7. The method of claim 1, wherein the random noise is generated with only a single round of communication with other parties participating in the MPC instance.

8. The method of claim 1, wherein values of the Hamming weight obtained from the function table segments are in secret share form.

9. The method of claim 1, wherein dividing the reconstructed overall value into sections comprises dividing the reconstructed overall value into sequential sections of equal bit length.

10. A method comprising:
generating a first n-bit random binary number;
generating a plurality of function table segments based on the first n-bit random binary number and all possible values of a second n-bit random binary number, wherein the plurality of function table segments include XOR values for portions of the first n-bit random binary number and a corresponding portion of the second n-bit random binary number and Hamming weight values of the portion of the second n-bit random binary number, wherein generating the plurality of function table segments comprises dividing the first n-bit random binary number into equal sized bit portions and generating a function table segment for each bit portion; and
providing, to each online component participating in a multiparty computation ("MPC") instance, a value associated with the first n-bit random binary number and the plurality of function table segments.

11. The method of claim 10, wherein the Hamming weight values are in secret share form while the XOR values are in plain text form.

12. The method of claim 10, wherein each function table segment of the plurality of function table segments is generated in parallel.

13. The method of claim 10, wherein each function table segment comprises a first column corresponding to the XOR values for corresponding portions of the first and second n-bit random binary numbers and a second column corresponding to Hamming weight values of the corresponding section of the second n-bit random binary number, wherein rows of the first column and the second column form a plurality of (key, value) pairs.

14. The method of claim 10, wherein an overall share of the Hamming weight of the second n-bit random binary number can be reconstructed by summing shares of the Hamming weight corresponding to portions of the XOR values of the first n-bit random binary number and the second n-bit random binary number.

15. A system for generating a random noise value for multiparty computation (MPC) comprising:
one or more offline components comprising one or more computers and one or more storage devices storing instructions that are operable, when executed by the one or more computers, to cause the one or more offline components to perform operations comprising:
generating a first n-bit random binary number;
generating a plurality of function table segments generated with respect to the first n-bit random binary number; and
providing, to each online component participating in an MPC instance, a respective share of the first n-bit random binary number and the plurality of function table segments; and
one or more online components jointly participating in the MPC instance, the one or more online components comprising one or more computers and one or more storage devices storing instructions that are operable, when executed by the one or more computers, to cause each of the one or more online components to respectively perform operations comprising:
receiving a first share of the first n-bit random binary number and the plurality of function table segments;
generating a first share of a second n-bit random binary number;
reconstructing an overall value of a comparison between the first n-bit random binary number and the second n-bit random binary number;
using the plurality of function table segments to determine a share of a Hamming weight of the second n-bit random binary number, comprising:
dividing the reconstructed overall value into sections and use each section to obtain a corresponding value of the Hamming weight corresponding to that section from the plurality of function table segments; and
using the share of the Hamming weight of the second n-bit random binary number in the MPC to introduce a random noise based on the Hamming weight to an MPC result.

16. The system of claim 15, wherein reconstructing the overall value of the comparison between the first n-bit random binary number and the second n-bit random binary number comprises:
calculating a first value based on a comparison between the received first share of the first n-bit random binary number and the generated first share of the second n-bit random binary number; and
receiving respective second values from each other online party, each second value corresponding to a comparison between respective shares of the first n-bit random binary number received by each other online component and respective shares of second n-bit random binary numbers generated by each other online party.

17. The system of claim 15, wherein using the plurality of function table segments to determine a share of the Hamming weight of the second n-bit random binary number comprises:
summing Hamming weight values obtained from the function table segments.

18. The system of claim 15, wherein generating the plurality of function table segments comprises:
dividing the first n-bit random number into sequential, equal sized bit portions and generating a function table segment for each bit portion; and
generating, in parallel, a respective function table segment for each portion of the first n-bit random binary number such that each function table segment comprises a column of values corresponding to values based on a comparison between corresponding portions of the first and second n-bit random binary numbers and a second column of Hamming weights of the corresponding section of the second n-bit random binary number.

19. The system of claim 18, wherein the Hamming weights of each function table segment are in secret share form while the values corresponding to the comparison between corresponding portions of the first and second n-bit random binary numbers are in plain text.

* * * * *